(12) United States Patent
Sinclair et al.

(10) Patent No.: US 11,188,538 B2
(45) Date of Patent: Nov. 30, 2021

(54) DYNAMIC GENERATED QUERY PLAN CACHING

(71) Applicant: Teradata US, Inc., Dayton, OH (US)

(72) Inventors: Paul Sinclair, Manhattan Beach, CA (US); Sung Jin Kim, Bueno Park, CA (US); Srikanth Reddy Muthyala, Dayton, OH (US); Samrat Pandiri, Dayton, OH (US)

(73) Assignee: Teradata US, Inc., San Diego, CA (US)

( * ) Notice: Subject to any disclaimer, the term of this patent is extended or adjusted under 35 U.S.C. 154(b) by 274 days.

(21) Appl. No.: 16/233,202

(22) Filed: Dec. 27, 2018

(65) Prior Publication Data

US 2020/0210429 A1 Jul. 2, 2020

(51) Int. Cl.
| | | |
|---|---|---|
| G06F 16/00 | (2019.01) | |
| G06F 16/2455 | (2019.01) | |
| G06F 16/248 | (2019.01) | |
| G06F 16/242 | (2019.01) | |
| G06F 16/2453 | (2019.01) | |

(52) U.S. Cl.
CPC ...... *G06F 16/24552* (2019.01); *G06F 16/242* (2019.01); *G06F 16/248* (2019.01); *G06F 16/24542* (2019.01)

(58) Field of Classification Search
CPC ......... G06F 16/24552; G06F 16/24542; G06F 16/248; G06F 16/242
See application file for complete search history.

(56) References Cited

U.S. PATENT DOCUMENTS

| | | | | |
|---|---|---|---|---|
| 6,934,699 | B1 * | 8/2005 | Haas | G06F 16/24539 |
| 2006/0085375 | A1 * | 4/2006 | Egan | G06F 16/24542 |
| 2008/0052266 | A1 * | 2/2008 | Goldstein | G06F 16/24549 |
| 2008/0201295 | A1 * | 8/2008 | Praveena | G06F 16/24552 |
| 2008/0313131 | A1 * | 12/2008 | Friedman | G06F 16/24542 |
| 2009/0030888 | A1 * | 1/2009 | Sahu | G06F 16/24542 |
| 2009/0094191 | A1 * | 4/2009 | Chaudhuri | G06F 16/24542 |
| 2010/0114868 | A1 * | 5/2010 | Beavin | G06F 16/24542 707/718 |
| 2010/0306188 | A1 * | 12/2010 | Cunningham | G06F 16/24542 707/713 |
| 2011/0055201 | A1 * | 3/2011 | Burger | G06F 16/2453 707/719 |
| 2012/0023092 | A1 * | 1/2012 | Egan | G06F 16/24542 707/718 |
| 2012/0084315 | A1 * | 4/2012 | Schneider | G06F 16/24545 707/769 |
| 2012/0310921 | A1 * | 12/2012 | Egan | G06F 16/24542 707/718 |
| 2014/0280036 | A1 * | 9/2014 | Korlapati | G06F 16/24542 707/718 |

* cited by examiner

*Primary Examiner* — Shiow-Jy Fan
(74) *Attorney, Agent, or Firm* — Gates & Cooper LLP

(57) ABSTRACT

A first query execution plan generated for a query on a second time the query was processed by a database is compared against a dynamically generated second query plan generated based on statistics only dynamic feedback for the second time the query is processed by the database. A determination is made on the second time as to whether to cache the first query execution plan, the second query execution plan, or no plan for third or more times the query is processed by the database. The query can be non-parameterized or parameterized.

20 Claims, 5 Drawing Sheets

DYNAMIC GENERATED QUERY PLAN CACHING

BACKGROUND

Incremental Planning and Execution (IPE) is an adaptive query optimization technique to dynamically generate query plan fragments and execute them for a query request, one query fragment at a time until the entire request has been executed. Feedback from each executed plan fragment is used to improve planning of the following query fragments.

A frequently processed query can have its execution plan cached, such that when the query is encountered a second or further time, the plan can be executed directly from cache without waiting for and expending hardware resources for producing (parsing and optimizing) the plan on each iteration that the query is presented.

However, IPE (dynamic) generated plans present significant challenges that have precluded any option for caching dynamic query plans.

One significant problem is due the nature of how the optimizer produces a dynamic query execution plan utilizes intermediate relational results (temporary tables housed in spools) from executed query fragments as feedback and uses values from the results (housed in the spools) to rewrite the query in the execution plan for a functionally equivalent query of the original query request.

Thus, if the underlying data changes (in the spool) between the times the plan was originally produced and the query is executed from any cached plan, the query results can be different and produce a "wrong answer."

A "wrong answer" scenario is not an issue with cached non-dynamic query execution plans, but a "wrong answer" scenario is a significant hurdle to overcome when attempting to cache dynamic query execution plans for repeated use with a given query request.

SUMMARY

In various embodiments, a system, methods, and a database for dynamic generate query plan caching are provided.

In one embodiment, a method for dynamic generate query plan caching is provided. A first dynamic query execution plan is generated for a query on a second time the query is processed against a database. Generation of a second dynamic query execution plan is controlled for the query on the second time the query is processed against the database. After generation of the second dynamic query execution plan and during the second time, a determination is made based on resource costs whether to cache the first dynamic query execution plan, the second dynamic query execution plan, or no query execution plan based for subsequent times that the query is encountered for processing against the database.

DETAILED DESCRIPTION

Any given query can be categorized as a non-parameterized query or a parameterized query. A non-parameterized query is one in which the elements or components of query provided in a Data Manipulation Language (DML) do not require or include any variable substituted parameters. A parameterized query is one in which the elements of components of the query include one or more variable substituted parameters.

Caching of both non-parameterized queries and parameterized queries are processed in novel manners as discussed herein for dynamic (IPE) query execution plans of the queries.

Figure 1A:
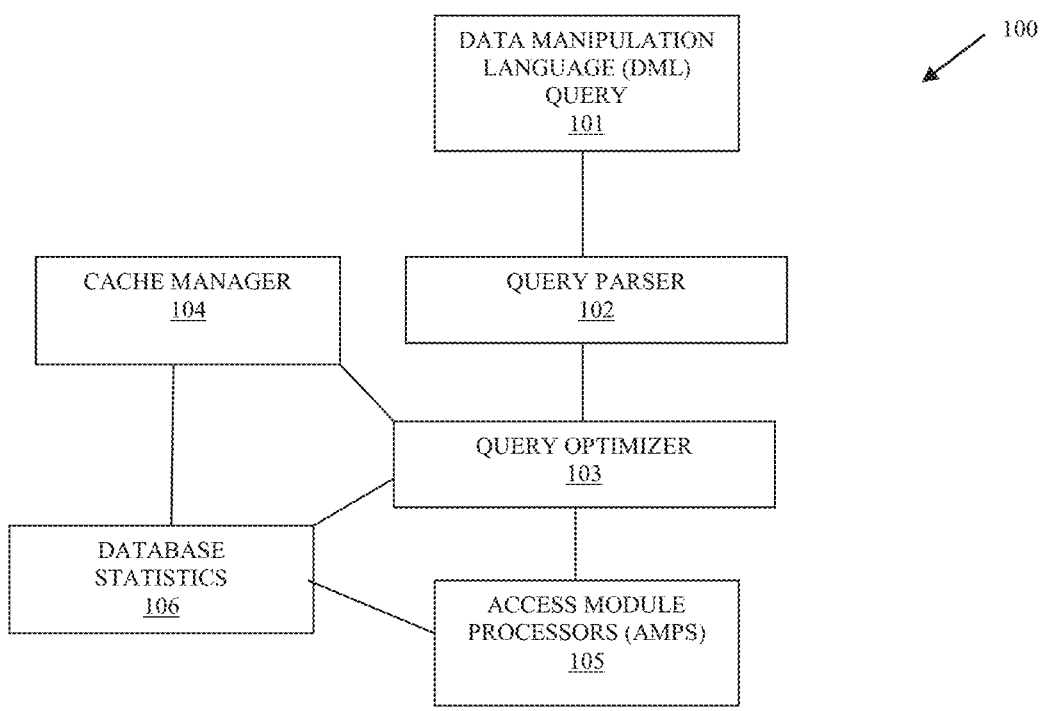
FIG. 1A is a diagram of a system for dynamic generated query plan caching, according to an embodiment.

FIG. 1A is a diagram of a system 100 for dynamic generated query plan caching, according to an embodiment. It is noted that the system 100 is shown in greatly simplified form with only those components necessary for understanding the teachings presented herein illustrated.

The system 100 includes a DML query 101, a query parser 102, a query optimizer 103, a novel cache manager 104, access module processors (AMPs) 105, and database statistics 106 for the tables of a database.

Moreover, the parser 102, the optimizer 103, the cache manager 104, and the AMPs 105 are implemented as executable instructions that reside in non-transitory computer-readable storage mediums. One or more computing devices include memory, the non-transitory computer-readable storage mediums, network connections, and one or more hardware processors. The hardware processors execute the executable instructions from the non-transitory computer-readable storage mediums.

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse"). The database may be relational, non-relational, or a combination of relational and non-relational.

The database provides a plurality of interfaces, operations, and tools based on the DML. In an embodiment, the DML includes: Structured Query Language (SQL), Information Management System (IMS), Conference and Committee on Data Systems Languages (CODASYL), Integrated Database Management System (IDMS), and others.

A query 101 before being executed against the database is parsed and optimized into a plurality of query plan fragments the collection of which represents a query execution plan. The query execution plan is then scheduled for execution by one or more of the AMPs 105. The process of producing the execution plan for the query 101 entails expending hardware resources (processor, memory, storage) and software resources (database services and/or tools).

For some queries 101 a significant amount of elapsed time and load is placed on the resources of the database when producing the plan for the query. This is especially true for dynamic (IPE) query execution plan generation because incremental portions of the query 101 are executed and feedback from results associated with those portions are used in rewriting the query and producing the dynamically generated plan. At the same time, dynamically generated plans are more resource efficient and can be used to produce a more optimized plan for a query having a non-dynamically generated plan. Therefore, dynamically generated plans are usually preferred.

However, as discussed above, dynamically generated plans are typically not believed to be cachable in the industry and no significant attempt has been made to cache dynamically generated plans because of the concern of having any rewritten query produce a "wrong answer" when executed from a cached dynamically generated plan.

The techniques described herein and below provide for caching of non-parameterized and parameterized queries 101 and their dynamic plans. Each type of query 101 (non-parameterized and parameterized) is addressed separately below with discussion of the FIG. 1.

Non-Parameterized Queries

For any given non-parameterized (hereinafter just "NP") query 101. The parser 102 and the optimizer generates at least two separate execution plans: a static plan produced without dynamic feedback and an IPE (dynamic) plan is produced with dynamic feedback. The dynamic plan is generated incrementally by multiple query fragments of the query 101 based on dynamic feedback provided for each prior executed fragment. The process of the parser 102 and optimizer in producing a static plan and a dynamic plan for each query 101 is referred to herein as "double planning per request,"

There are two kinds (types) of feedback that are evaluated during the dynamic plan generation. The first kind of feedback is referred to as "results feedback," which is data values in a spool that is fed back to the optimizer 103, the optimizer 103 rewrites a query 101 using these data values (i.e., replace a corresponding portion of subquery by the data values). The second kind of feedback that are evaluated during the dynamic plan generation is referred to as "statistics feedback," which is statistics information 106 about the data in a spool (intermediate table used in executing fragments of the query 101 for rewriting the query 101); the optimizer 103 uses statistics feedback to find an optimal plan for the remaining portion of request. Different caching policies are used by the cache manager 104 based on the presence of statistics and/or results feedback.

When the optimizer 103 requests results feedback from one or more of the AMPs 105 during dynamic plan generation for the query 101, if the size of the spool is beyond a defined threshold value, the AMPs 105 are configured to instead return statistics feedback. When the AMPs 105 return the statistics feedback instead of the requested results feedback, this is referred to as "a feedback kind switching from results to statistics," Similarly, when the optimizer 103 requests statistics feedback from one or more the AMPs 105 during dynamic plan generation for the query 101, if the size of the spool is below the defined threshold value, the AMPs 105 are configured to return results feedback. When the AMPs 105 return results feedback instead of statistics feedback, this is referred to as "a feedback kind switching from statistics to results." The cache manager 104 is configured to controls how feedback kind switching is controlled for determining caching of dynamically generated plans for a query 101.

The cache manager 104 determines when overhead (resource usage and elapsed processing time) of collecting statistics feedback should be considered a factor in determining when to cache a NP dynamically generated plan and when the overhead should be ignored and not considered as a factor.

In an embodiment, the cache manager 104 avoids caching a plan of a NP query 101 when the query 101 is processed for a first time. Instead, the cache manager 104 attempts to cache a plan at a second or next time after the query 101 was processed already a first time. In some instances, a decision to cache a plan when a query 101 is first processed may unduly cause the cache to be filled by plans for queries 101 that are not frequently processed, such that such cached plans remain in cache until purged occupying valuable memory that could be used by queries 101 and their plans that are frequently processed.

Moreover, the cache manager 104 does not cache any dynamically generated plan for which results feedback was provided by the AMPs 105 because such a cached plan could return a "wrong answer" for the query 101 if the underlying data associated with the spool changes at a time the plan is executed from the cache. Thus, the cache manager 104 does not cache any dynamically generated plan that used results feedback in plan generation by the optimizer 103. This does not mean that no plan is cached for such a query 101, it just means that a plan for such a query 101 that relies on results feedback is not cached.

The cache manager 104 distinguishes dynamic generated plans for queries 101 into three types of dynamically generated plans based on the presence of statistics feedback and/or results feedback. The type of a dynamic plan for a request is determined, by the cache manager 104, after the dynamic plan is fully executed for the query 101 that is processed for the first time. When a dynamic plan has results feedback, the cache manager 104 will not completely give up on a cache opportunity and the benefits of statistics feedback; instead the cache manager 104 generates an "alternative" plan, which just excludes results feedback. The alternative plan is cached if the original plan (that included results feedback) turns out not to bring significant performance benefits in the execution time required for the query 101.

The cache manager 104 distinguishes between three types of plans based on the presence of statistics feedback and/or results feedback are as follows:

1. dynamic plan with statistics feedback only (SFO), whose alternative plan is also SFO;
2. dynamic plan with both statistics feedback and results feedback (SFRF), whose alternative plan is a dynamic plan obtained by enabling SFO but disabling results feedback (SFX); and
3. dynamic plan with results feedback only (RFO), whose alternative plan is a static plan (non-dynamically generated plan).

The cache manager 104 in cooperation with the parser 102, the optimizer 103, the AMPS 105, and the statistics 106 processes in three phases:

During phase one the query 101 is being processed a first time (i.e., the first time the query 101 is seen within the database). The cache manager 104 allows the parser, the optimizer 103 and the AMPs 105 to perform dynamic planning with no restrictions. The performance of executing the dynamic plan for the query 101 is measured. The resulting plan produced is identified as one of: SFO, SFRF, and RFO. The cache manager 104 creates a cache entry for the query 101 in cache. The cache entry includes the performance measurement information from the statistics (such as parsing time needed by the parser 102, parsing Central Processing Unit (CPU) consumption, a total query 101 elapsed time, a total number of Input/Output (I/O) counts, etc.). The cache manager 104 also includes the dynamic plan type that was produced by the optimizer 103, but the actual dynamic plan is not included in the cache entry at this time (first time query 101 is processed by the database).

During phase two, the cache manager 104 determines that the query 101 has been processed once before during phase one. Here, an alternative plan to what was generated in phase one is produced by the optimizer 103 and the cache manager 104 determines whether or not to cache that alternative plan. In phase one, no plan was cached but information about the execution of the query 103 was retained in the cache. The three types of plans (SFO, SFRF, and RFO) are considered by the cache manager 104 in making the determination as to whether to cache the alternative plan or not.

For an SFO alternative plan request, the cache manager 104 caches the SFO generated plan. In this case, the feedback kind switching is controlled carefully. First, the switching from statistics to results feedback is disabled, due to the possibility that the dynamic plan generated/executed in this phase could include results feedback even though this switching did not happen in the first phase. Second, due to the possibility of a switch from results to statistics feedback in the first phase (that is why results feedback is not seen and the dynamic plan is being regarded as an SFO plan), the cache manager 104 directly instructs the optimizer 103 to obtain statistics feedback from the AMPs 105, instead of asking for results feedback and expecting a possible switch. This removes the possibility that the optimizer 103 and the AMPs 105 switch from statistics to results feedback in the second phase.

For an SFRF alternative plan request, an SFX plan is generated. First, switching from statistics to results feedback is disabled. The other kind of switching does not matter since there is no chance to see a switch from results to statistics feedback. Note that the results feedback is not requested at all for the SFX plan. Second, the performance of SFX plan is measured while SFX plan is generated/executed. Third, the cache manager 104 caches the SFX plan, if its performance is better than SFRF plan's performance measurement saved in the corresponding cache entry. In the performance comparison, the overhead of parsing and collecting dynamic statistics for SFX plan can be ignored, because this overhead does not occur when SFX plan is obtained from the cache. On the other hand, if the SFRF plan can take advantage of results feedback significantly so its performance (even including the overhead of parsing and collecting dynamic statistics) is better than SFX plan's performance, the cache manager 104 does not cache any plan for this request and lets SFRF plan be generated/executed every time this request is seen in the future.

For a RFO plan request, the cache manager 104 instructs the optimizer 103 to generate a static plan as the alternative plan. Dynamic planning by disabling results feedback of the optimizer 103 is not required since this is equivalent to the static plan. It is required to measure the performance of the static plan so that the cache manager 104 can compare the performance of the static plan and the performance of RFO plan. The cache manager 104 caches the static plan if its performance is better than RFO plan's performance. In the performance comparison, parsing overhead of the static plan can be ignored.

During phase three, any available cache plan for the query 101 is used if present in the cache entry for the query 101. Otherwise, the optimizer is instructed to do IPE plan generation with no restrictions (as was done in phase one). The parser 102, the optimizer 103, and the cache manager 104 consider the following factors when utilizing a cached plan available in the cache entry for the query 101. When a cached dynamic plan is used, operations which trigger collecting statistics feedback (except as noted below) and end fragment steps are ignored. Note that the cached plan already took advantage of statistics feedback. Thus, it would be pointless to collect statistics feedback and use them for planning, since the purpose of caching is to reuse a saved plan and avoid repeated parsing and/or repeated statistics collection. In addition to traditional cache management techniques, the technique presented herein allow operations to collect statistics feedback for a cached plan periodically (for example, every $10^{th}$ occurrence of the query 101) if the cached plan is either an SFO plan or an SFX plan. Note that the returned statistics are not consumed for planning of the current query 101, but used to compare the original statistics (these could be saved with the cached plan). If the statistics differ by some threshold value, this can trigger the cache manager 104 to perform re-planning for the next occurrence of the query 101.

Figure 1B:
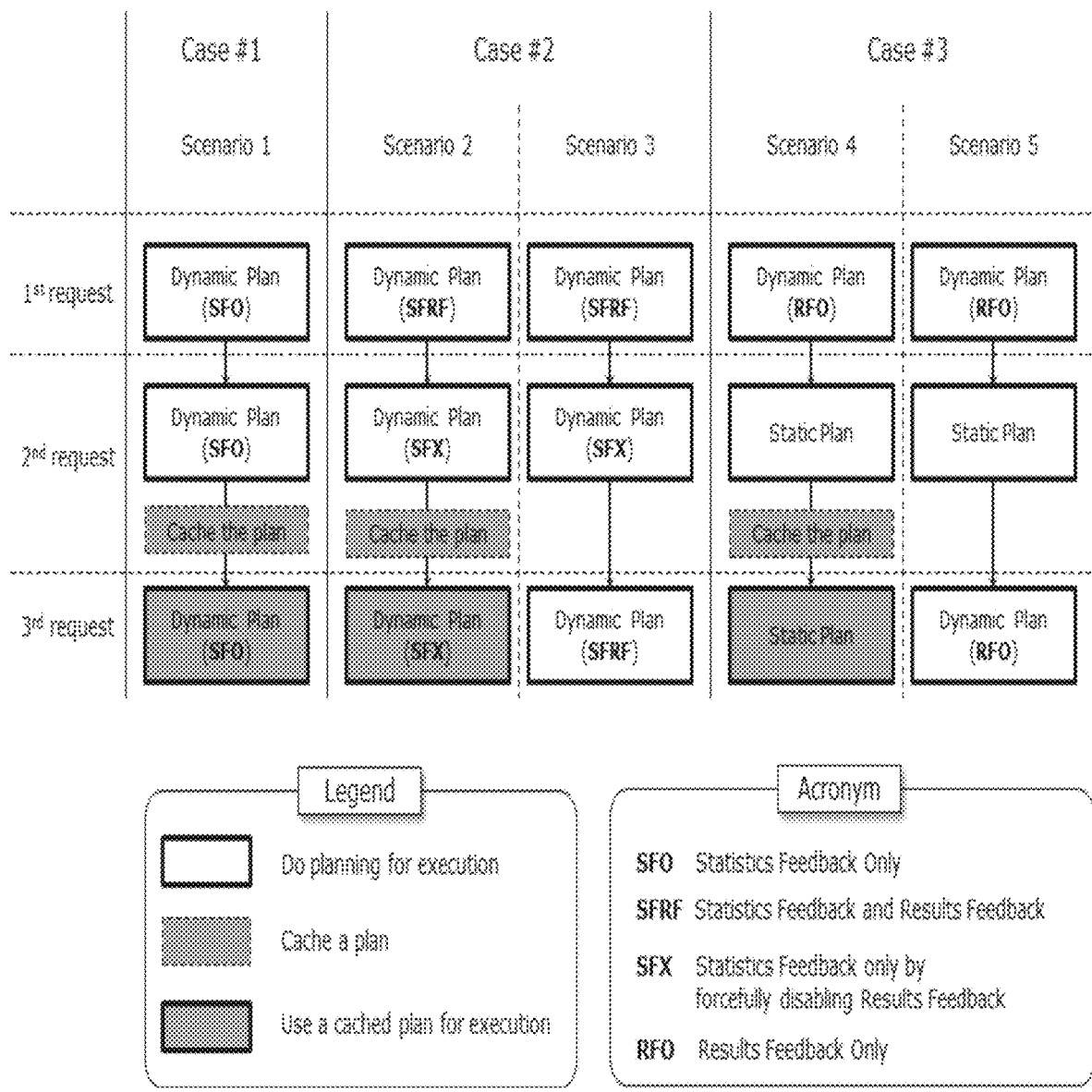
FIG. 1B is a diagram illustrating how caching is handled for different situations with a non-parametrized dynamic query plan, according to an example embodiment.

FIG. 1B is a diagram illustrating how caching is handled for different situations by the cache manager 104 with a NP dynamic query plan, according to an example embodiment.

There are 5 scenarios (all of which were discussed above) summarized in a table format for comprehension of each scenario. The scenarios are based on what type of dynamic plan is produced by the optimizer 103 the first time a query 101 is processed where there are no restrictions placed on the optimizer 103 during planning (dynamic generation of the plan for the given query 101). The second time the query 101 is encountered, the planning is controlled by the cache manager 104 to force the optimizer 103 to produce a plan that is either based on statistics only feedback or based on forcing the optimizer 103 to disable any results feedback planning; a decision is also made the second time the query 101 is encountered whether a plan is to be cached and which plan is cached. The third or subsequent times that the query 101 is processed, is based on whether there is any cached plan for a cache entry associated with the query 101 is in cache (in which case the AMPs 105 execute the cached plan) or not (in which case dynamic planning by the parser 102, optimizer 103, and AMPs 105 occur each time the query 101 is processed).

The rows of FIG. 1B illustrate the iterations in which a given query 101 is processed by the database and the columns illustrate the three cases, cases #2 and #3 have two possible scenarios based on the expense or costs associated with the plan produced the first time the query 101 was encountered versus the plan produced as the alternative plan produced when the query 101 was encountered a second time for processing by the database.

In case #1 and scenario #1 there is a SFO plan generated for a given query 101 by the optimizer 103 when the query 101 is first processed by the database. The second time the query 101 is processed, the SFO is selected as the alternative plan and the cache manager 104 caches that SFO plan in cache. The third and subsequent times the query 101 is processed, the parsing and optimizing is ignored and the SFO plan for the query is directly processed and executed by the AMPs 105 from a corresponding cache entry for the query 101 from cache.

In case #2 and scenario #2, there is an SFRF plan generated for a given query 101 by the optimizer 103 when the query 101 is processed a first time. The second time that query 101 is processed, an SFX plan is selected as an alternative plan for the query 101. The SFX plan is then cached and subsequently directly executed by the AMPs 105 from the corresponding cache entry for the query 101 on third and subsequent times the query 101 is processed. This is a case where the statistics based feedback plan is less expensive than the original statistics and results based feedback plan, such that the SFX plan is cacheable.

In case #2 and scenario #3, there is an SFRF plan generated for the query 101 by the optimizer 103 when the query is processed a first time. The second time that query 101 is processed, an SFX plan is selected as the alternative plan but is not cached (based on conditions and factors discussed above); thus, each time the query 101 is encountered the parser 102, the optimizer 103, and the AMPs 105 perform dynamic plan execution to execute a SFRF plan. This is a case where the statistics and results feedback plan is less expensive than the statistics feedback plan, such that no caching is desired for the query 101.

In case #3 and scenario #4, there is an RFO plan generated by the optimizer 103 the first time the query 101 is processed by the database. A static plan (non-dynamic plan) is generated and selected as the alternative plan and a determination is made that the static plan is less expensive as the RFO plan, such that the static plan is cached in the cache entry for the query 101. Third and subsequent times the query 101 is processed, the AMPs 105 execute the query 101 from the cached static plan.

In case #3 and scenario #5, there is an RFO plan generated by the optimizer 103 the first time the query is processed by the database. A static plan (non-dynamic plan) is generated as the alternative plan where a determination is made that the RFO plan is less expensive than the static alternative plan. Here, no static plan is cached and third and subsequent times that the query 101 is processed, the parser 102, the optimizer 103, and the AMPs 105 perform plan processing and dynamically generate the plan (as an RFO plan), which is then executed by the AMPs 105.

Parameterized Queries

Conventionally, a parameterized (P) query plan that is dynamically generated is not capable of being cached for subsequent executions by the AMPs 105 because its parameters are specific to peeked values associated with the parameters and, the intermediate results in query fragment results could produce a "wrong answer" for subsequent executions of the P query plan. However, as discussed above with the NP query plan caching, the cache manager 104 has provided a solution to NP query plan caching.

The optimizer 103 is modified to generate a template for the query 101 having parameter variables represented that are capable of being replaced with actual parameter values in the query 101. The template P query 101 is hashed to a hash entry value, the hash entry value representing a query identifier for the original submitted P query 101. This permits the parser 102, optimizer 103, and the cache manager 104 to recognize the P query each time the P query 101 is submitted for processing by the database with specific parameter values that match the template.

The first time the P query 101 is processed a generic (parameter variable-based) static plan is produced by the optimizer 103 without peeking values for the parameter variables in the template. Also, the optimizer 103 generates a specific static plan for the P query 101 that substitutes peak values in for the parameters variables of the P query 101 in the template. The optimizer 103 is then permitted to dynamically generate a specific and non-parameterized plan using the specific parameter values provided in the P query 101 and the dynamically generated plan is executed by the AMPs 105 for the first-processed P query 101.

The optimizer 103 and the cache manager 104 then perform the same analysis as was presented above for the 5 scenarios on second and third iterations that the P query 101 is detected for processing within the database for purposes of determining whether to cache a dynamically generated plan for the template (in the second iteration), a static plan (in the second iteration), or not caching any plan at all for the template P query 101 (ensuring that specific parameter-supplied values for each P query 101 on each second or more iteration encountered for the P query 101 that dynamically planning is processed).

Again, during second iterations that the P query 101 is processed, the optimizer 103 and the AMPs 105 are placed in a statistics feedback only for the template-based P query 101. However, the peeking of the parameter values is disabled for the parameter variables of the template P query 101 in addition to the disabling of results feedback. The AMPs 105 are configured to not switch during dynamic planning from statistics feedback to the results feedback when results feedback is a small amount of data, such that the AMPs 105 stay with the statistics feedback only. The statistics-based non-peeking parameter values generated dynamic plan by the optimizer 103 is then compared against the plan produced by the optimizer 103 the first time the P query 101 was encountered (similar to what was discussed above with the NP query plan caching).

It is to be noted that during the second time that a query 101 is encountered for processing within the database, the optimizer can be configured with a threshold value that weights the processing time of the parser 103 to be lower than what is typically done during planning because when the dynamic plan is cached and used in third or more iterations that the query 101 is processed, little parsing, if any, is needed. Because parsing time is saved if the dynamic plan is cached, the cost associated with parsing can be weighted lower in expense calculations to determine whether or not to cache a dynamic plan (based on statistics only feedback provided by the AMPs 105 and based on non-peeking parameter values for a P query 101).

These and other embodiments are now discussed with reference to the FIGS. 2-4.

Figure 2:
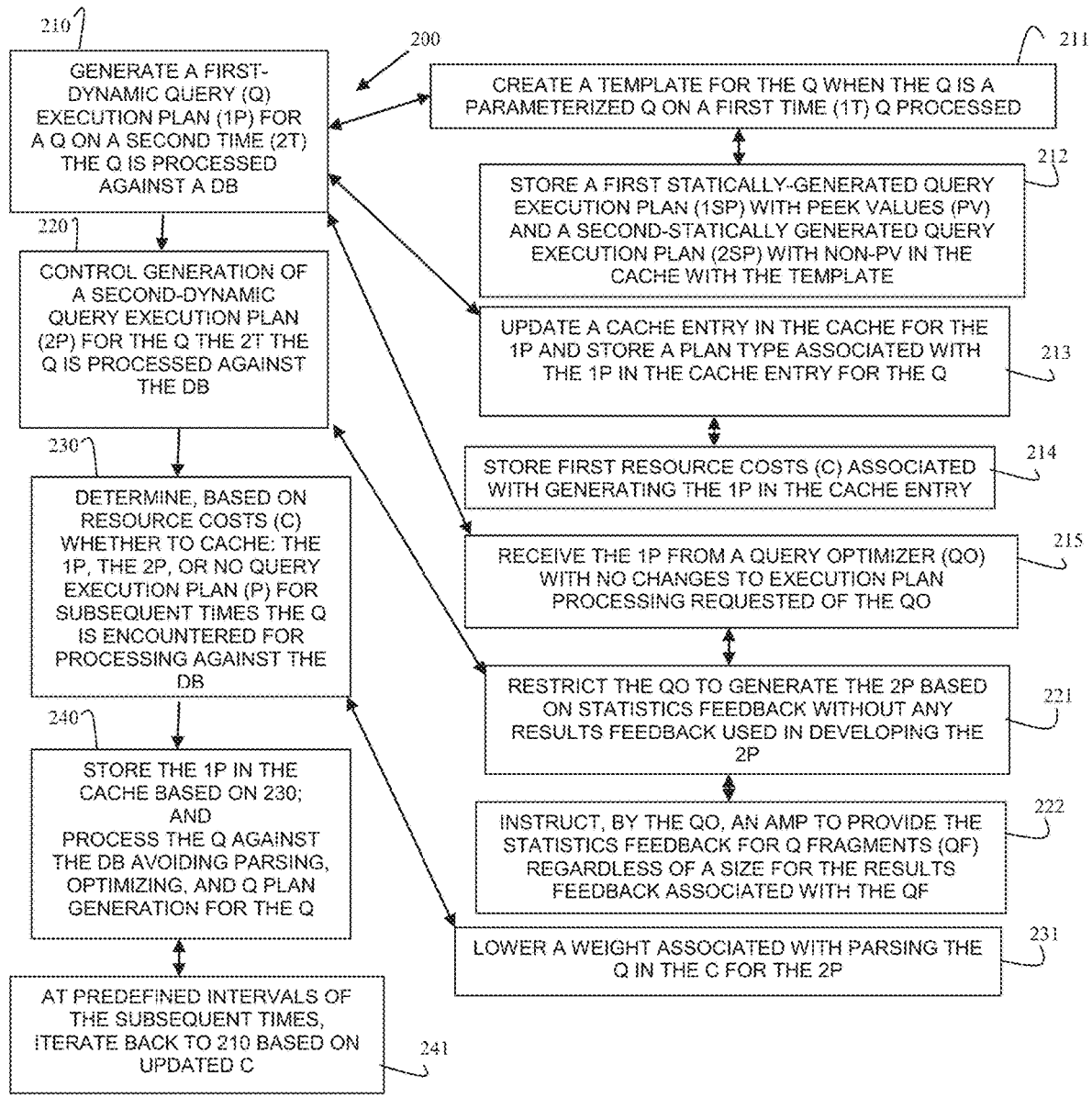
FIG. 2 is a diagram of a method for dynamic generated query plan caching, according to an example embodiment.

FIG. 2 is a diagram of a method 200 for dynamic generated query plan caching, according to an example embodiment. The method 200 is implemented as one or more software modules referred to as a "query cache manager"). The query cache manager represents executable instructions that are programmed within memory or a non-transitory computer-readable medium and executed by one or more hardware processors of a device. The query cache manager may have access to one or more network connections during processing, which can be wired, wireless, or a combination of wired and wireless.

In an embodiment, the query cache manager is implemented within a data warehouse across one or more physical devices or nodes (computing devices) for execution over a network connection.

In an embodiment, the query cache manager includes all of or any combination of: the parser 102, the optimizer 103, the cache manager 104, and/or the AMPs 105. That is, the query cache manager performs, inter alia, the processing as discussed above with the FIGS. 1A-1B.

At 210, the query cache manager generates a first dynamically-generated query execution plan (first plan) for a query a second time the query is processed by the database.

In an embodiment, at 211, the query cache manager creates a template for the query when the query is a parameterized query on a first time that the query was encountered and processed.

In an embodiment of 211 and at 212, the query cache manager stores a first statically-generated query execution plan with peek values and a second statically-generated query execution plan with non-peek values in cache with the template.

In an embodiment, at 213, the query cache manager updates a cache entry in the cache for the first plan and stores a plan type associated with the first plan in the cache entry. The first plan is not stored in the cache the first time the query was processed; rather and as discussed above, the plan type associated with how the first plan was generated is stored in the cache entry.

In an embodiment of 213 and at 214, the query cache manager stores first performance costs associated with generating the first plan in the cache entry.

In an embodiment, at 215, the query cache manager receives the first plan from a query optimizer (such as query optimizer 103) with no changes to the execution plan processing (plan generation) requested of the query optimizer.

At 220, the query cache manager controls generation of a second dynamically-generated query execution plan (second plan) for the query the second time the query is processed against the database.

In an embodiment of 215 and 220, at 221 the query cache manager restricts the query optimizer to generate the second plan based on statistics feedback without any results feedback used in developing the second plan.

In an embodiment of 221 and at 222, the query optimizer, instructs an AMP to provide the statistic feedback without any results feedback regardless of a size for the results feedback associated with the query fragments.

At 230, the query cache manager determines, based on resource costs, whether to cache the first plan, the second plan or no query plan for subsequent times the query is encountered for processing against the database.

In an embodiment, at 231, the query cache manager lowers a weight associated with parsing the query for the costs determined for the second plan. This is because if a dynamically generated plan is cached, the parsing costs will not be presented and will not have to be a consideration or is less of a consideration.

In an embodiment, at 240, the query cache manager stores the first plan in the cache based on 230 and processes the query against the database while avoiding any parsing, optimizing, and query plan generation for the query.

In an embodiment of 240, at 241, the query cache manager, at predefined interfaces of the subsequent times iterates back to 210 based on updated costs.

Figure 3:
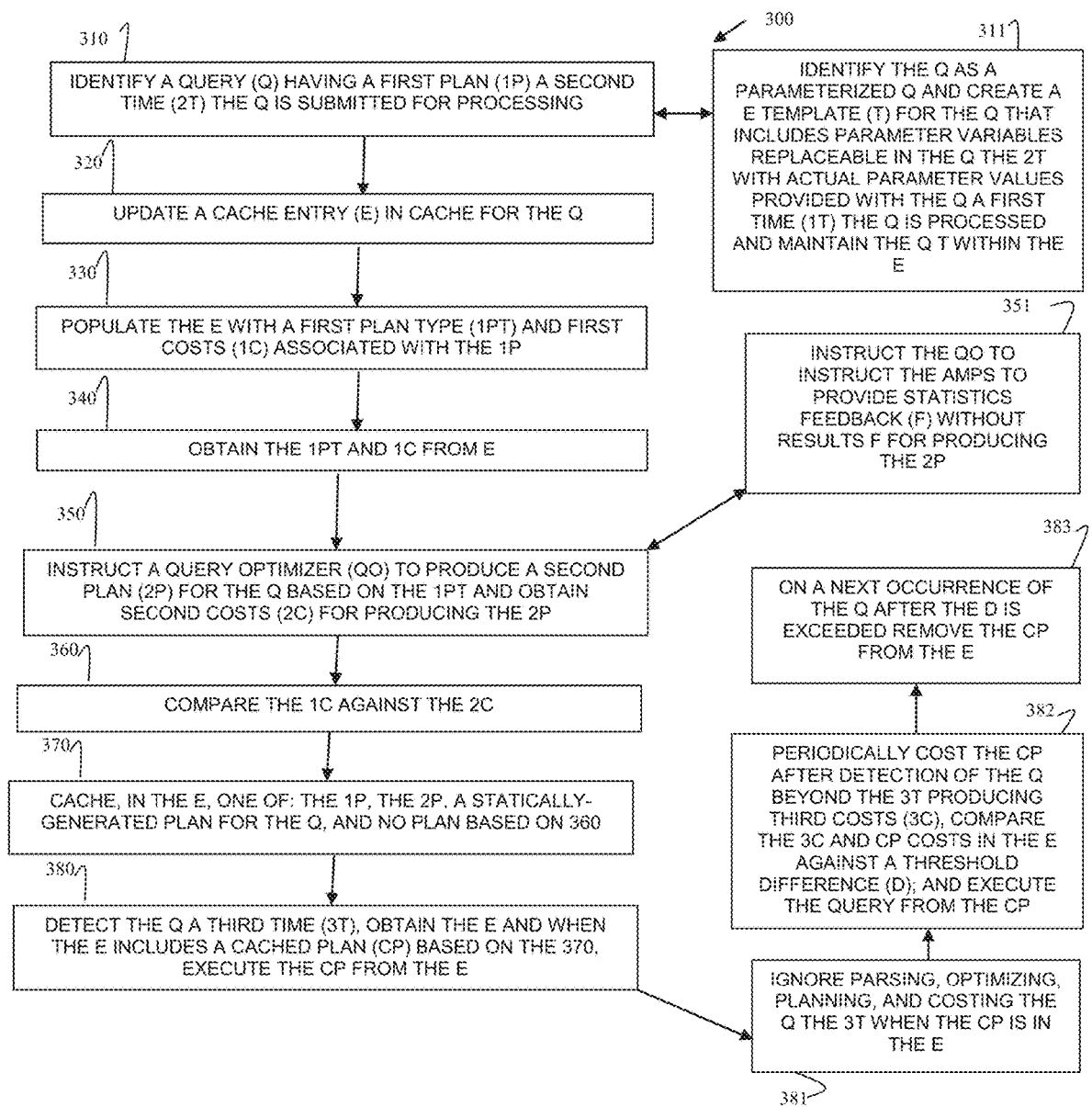
FIG. 3 is a diagram of another method for dynamic generated query plan caching, according to an example embodiment.

FIG. 3 is a diagram of another method 300 for dynamic generated query plan caching, according to an embodiment. The method 300 is implemented as one or more software modules referred to as a "dynamically-generated query plan cache manager." The dynamically-generated query plan cache manager represents executable instructions that are programmed within memory or a non-transitory computer-readable medium and executed by one or more hardware processors of a device. The dynamically-generated query plan cache manager may have access to one or more network connections during processing, which can be wired, wireless, or a combination of wired and wireless.

The dynamically-generated query plan cache manager presents another and in some ways enhanced perspective of the processing discussed above with the FIGS. 1A-1B and 2.

In an embodiment, the dynamically-generated query plan cache manager is all or any combination of: the parser 102, the optimizer 103, the cache manager 104, and the AMPs 105, and/or the method 200.

At 310, the dynamically-generated query plan cache manager identifies a query having a first dynamically generated plan (first plan) a second time the query is submitted for processing against a database.

In an embodiment, at 311, the dynamically-generated query plan cache manager identifies the query as a parameterized query and creates a query template for the query that includes parameter variables replaceable in the query subsequent times the query is encountered with actual parameter values provided with the query the subsequent times. This template is stored in the cache the first time the query is processed. Such, that the cache entry for the query already exists and includes the template at 320. That is, query template is maintained in the cache entry (see 320 below).

At 320, the dynamically-generated query plan cache manager updates a cache entry in cache for the query.

At 330, the dynamically-generated query plan cache manager populates the cache entry with a first plan type and first performance costs associated with the first plan.

At 340, the dynamically-generated query plan cache manager obtains the first plan type and the first costs from the cache entry for the query.

At 350, the dynamically-generated query plan cache manager instructs a query optimizer (such as optimizer 103) to produce a second dynamically generated query plan (second plan) for the query based on the first plan type. The dynamically-generated query plan cache manager obtains second performance costs associated with the producing the second plan.

In an embodiment, at 351, the dynamically-generated query plan cache manager instructs the query optimizer to instruct the AMPs (such as AMPs 105) to provide statistics feedback without any results feedback for producing the second plan (even if the size of the results feedback is deemed minimal).

At 360, the dynamically-generated query plan cache manager compares the first costs against the second costs for purposes of identifying a lowest cost.

At 370, the dynamically-generated query plan cache manager caches, in the cache entry, one of: the first plan, the second plan, a statically-generated plan generated for the query, and no plan based on the plan associated with the lowest cost. No plan is cached, when the lowest cost plan is associated with a plan that depended on results feedback as discussed above.

In an embodiment, at 380, the dynamically-generated query plan cache manager detects the query a third time and obtains the cache entry contents for the query. When the cache entry includes a cached plan (based on 370), the dynamically-generated query plan cache manager executes the cached plan for the query from the cache entry.

In an embodiment of 380 and at 381, the dynamically-generated query plan cache manager ignores parsing, optimizing, planning, and costing the query the third time when the cached plan is in the cache entry and is directly executed from the cache entry.

In an embodiment of 381 and at 382, the dynamically-generated query plan cache manager periodically costs the cached plan after detection of the query beyond the third time and produces third costs. The third costs are compared against cached planned costs in the cache entry against a threshold difference and executes the query from the cached plan in the cache entry.

In an embodiment of 382 and at 383, the dynamically-generated query plan cache manager, on a next occurrence of the query after the threshold difference is exceeded removes the cached plan from the cache entry. This forces an iteration of cache planning determination and refreshes the cache entry with a new plan for the query (if any plan is cached at all—such as when on the next iteration the lowest cost plan is one that is based on a plan developed using results feedback.

Figure 4:
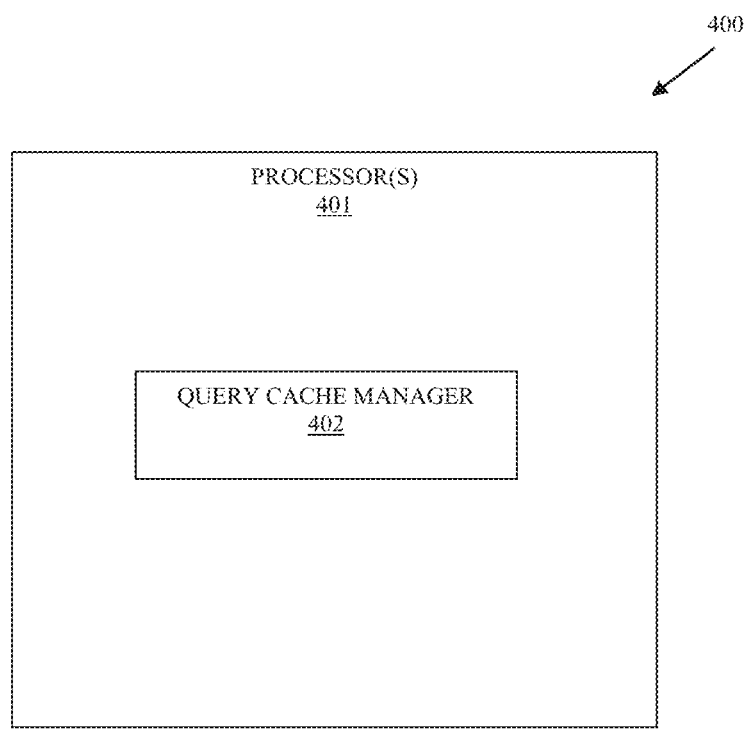
FIG. 4 is a diagram of a database for dynamic generated query plan caching, according to an example embodiment.

FIG. 4 is a diagram of a database 400 for dynamic generated query plan caching, according to an example embodiment. The database 400 includes a variety of hardware components and software components. The software components are programmed as executable instructions into memory and/or a non-transitory computer-readable medium for execution on the hardware components (hardware processors). The database 400 includes one or more network connections; the networks can be wired, wireless, or a combination of wired and wireless.

The database 400 implements, inter alia, the processing discussed above with the FIGS. 1A-1B and 2-3.

The database 400 includes at least one hardware processor 401 and a non-transitory computer-readable storage medium having executable instructions representing a query cache manager 402.

In an embodiment, the query cache manager 402 is all of or any combination of: the parser 201, the optimizer 103, the cache manager 104, the AMPs 105, the method 200, and/or the method 300.

The query cache manager 402 is configured to execute on the at least one hardware processor 401 from the non-transitory computer-readable storage medium to perform processing to: retain first costs for a first plan generated for a query a second time the query is submitted to the database 400 along with a first plan type associated with the first plan; generate a second plan for the query the second time the query is submitted to the database 400 that is based on statistics feedback without any intermediate results feedback along with second costs for the second plan; determine, the second time, whether to cache the first plan, the second plan or no plan based on the first plan type, the first costs, and the second costs; and execute any cached plan present in the cache a third time the query is submitted to the database 400.

The query cache manager 402 is further configured to identify when the query is a parameterized query on a first time the query is processed and maintain a template for the query in the cache along with a static plan for peek values associated with parameters of the query and a second static plan for non-peek values associated with the query.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
generating a first dynamic query execution plan for a query on a second time the query is processed against a database, wherein fragments of the first dynamic query execution plan are executed individually until the query has been executed, and feedback from each of the executed fragments is used to improve planning of following fragments of the first dynamic query execution plan;
controlling generation of a second dynamic query execution plan for the query on the second time the query is processed against the database based on the feedback from each of the executed fragments comprising statistics feedback and/or results feedback; and
determining, based on resource costs, whether to cache the first dynamic query execution plan, the second dynamic query execution plan, or no query execution plan when both the first and second dynamic query execution plans depend on the results feedback, for subsequent times the query is encountered for processing against the database.

2. The method of claim 1, wherein generating further includes creating a template for the query when the query is a parameterized query on a first time the query is processed.

3. The method of claim 2, wherein creating further includes storing a first statically-generated parameter-based query execution plan with peek values for parameters of the parameterized query and a second statically-generated parameter-based query execution plan with non-peek values in the cache for the template.

4. The method of claim 1, wherein generating further includes updating a cache entry in the cache for the first dynamic query execution plan and storing a plan type associated with the first dynamic query execution plan in the cache entry for the query.

5. The method of claim 4, wherein creating further includes storing first resource costs associated with generating the first dynamic query execution plan in the cache entry.

6. The method of claim 1, wherein generating further includes receiving further includes receiving the first dynamic query execution plan from a query optimizer with no changes to execution plan processing requested of the query optimizer.

7. The method of claim 6, wherein controlling further includes restricting the query optimizer to generate the second dynamic query execution plan based on statistics feedback without any results feedback used in developing the second dynamic query execution plan.

8. The method of claim 6, wherein restricting further includes instructing, by the query optimizer, an access module processor (AMP) to provide the statistics feedback for query fragments regardless of a size of the results feedback associated with the query fragments.

9. The method of claim 1, wherein determining further includes lowering a weight associated with parsing the query in the resource costs for the second dynamic query execution plan.

10. The method of claim 1 further comprising:
storing the first dynamic query execution plan in cache based on the determining; and
processing the query from the cache on the subsequent times against the database avoiding parsing, optimizing, and query plan generation for the query.

11. The method of claim 1 further comprising:
at predefined intervals of the subsequent times, iterating back to the generating the query based on updated resource costs.

12. A method, comprising:
identifying a query having a first dynamically-generated query execution plan a second time the query is submitted for processing, wherein fragments of the first dynamically-generated query execution plan are executed individually until the query has been executed, and feedback from each of the executed fragments is used to improve planning of following fragments of the first dynamically-generated query execution plan;
updating a cache entry in cache for the query;

populating the cache entry with a first query plan type and first performance costs associated with producing the first dynamically-generated query execution plan;

obtaining the first query plan type and first performance costs from the cache entry;

instructing a query optimizer to produce a second dynamically-generated query execution plan for the query based on the first query plan type and the feedback from each of the executed fragments comprising statistics feedback and/or results feedback, and obtaining second performance costs for producing the second dynamically-generated query execution plan;

comparing the first performance costs against the second performance costs; and caching, in the cache entry, one of the first dynamically-generated query execution plan, the second dynamically-generated query execution plan, a statically-generated query execution plan for the query, and no query execution plan when both the first and second dynamically-generated query execution plans depend on the results feedback, based on the comparing.

13. The method of claim 12 further comprising, detecting the query a third time, obtaining the cache entry and when the cache entry includes a cached plan based on the caching, execute the cached plan from the cache entry.

14. The method of claim 13 further comprising, ignoring parsing, optimizing, planning, and costing the query the third time when the cached plan is in the cache entry.

15. The method of claim 14 further comprising, periodically costing the cached plan after detection of the query beyond the third time producing third performance costs, comparing the third performance costs and cached plan costs in the cache entry against a threshold difference; and executing the query from the cached plan.

16. The method of claim 15, wherein periodically costing further includes on a next occurrence of the query after the threshold difference is exceeded removing the cached plan from the cached entry.

17. The method of claim 12, wherein identifying further includes identifying the query as a parameterized query and creating a query template for the query that includes parameter variables replaceable in the query the second time with actual parameter values provided with the query a first time the query is processed and maintaining the query template within the cache entry.

18. The method of claim 12, wherein instructing further includes instructing the query optimizer to instruct the access module processors to provide statistics feedback without results feedback for producing the second dynamically-generated query execution plan.

19. A database, comprising:
at least one hardware processor;
a non-transitory computer-readable storage medium having executable instructions representing a query cache manager;
the query cache manager configured to execute on the at least one hardware processor from the non-transitory computer-readable storage medium and to perform processing to:
retain first costs for a first dynamic generated query plan generated for a query a first time the query is submitted to the database along with a first plan type associated with the first dynamic generated query plan, wherein fragments of the first dynamic generated query plan are executed individually until the query has been executed, and feedback from each of the executed fragments is used to improve planning of following fragments of the first dynamic generated query plan;
generate a second dynamic generated query plan for the query the second time the query is submitted to the database that is based on the feedback from each of the executed fragments comprising statistics feedback without any intermediate results feedback, along with second costs for the second dynamic generated query plan;
determine, the second time, whether to cache a new first dynamic generated query plan generated on the second time, the second dynamic generated query plan, or no query plan when both the first and second dynamic generated query plans depend on the results feedback, based on the first plan type, the first costs, and the second costs;
execute any cached plan present in the cache a third time the query is submitted to the database.

20. The database of claim 19, wherein cache manager is further configured to perform processing to: identify when the query is a parameterized query on a first time the query is processed and maintain a template for the query in the cache along with a static plan for peek values associated with parameters of the query and a second static plan for non-peek values associated with the query.

* * * * *